No. 675,506. Patented June 4, 1901.
J. H. BROWN.
ATTACHMENT FOR SAWMILL CARRIAGES.
(Application filed Mar. 22, 1901.)
(No Model.)
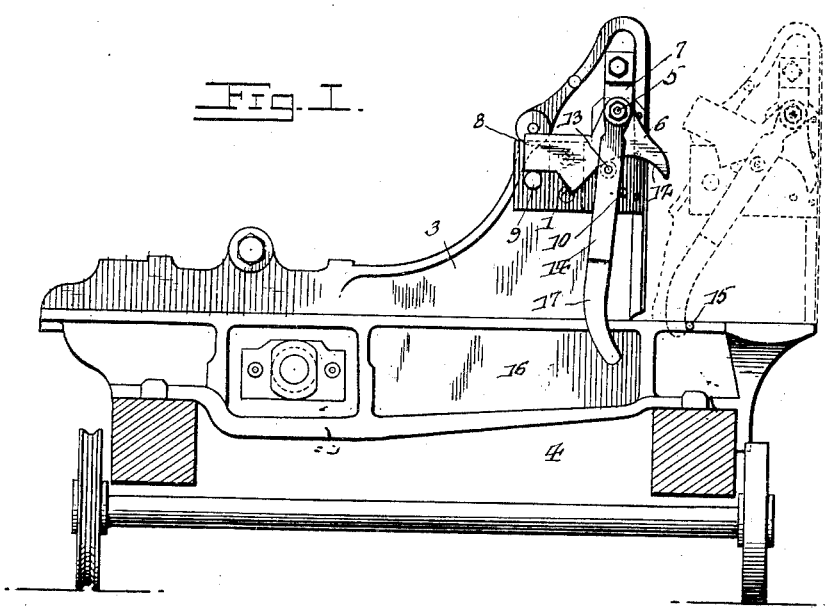
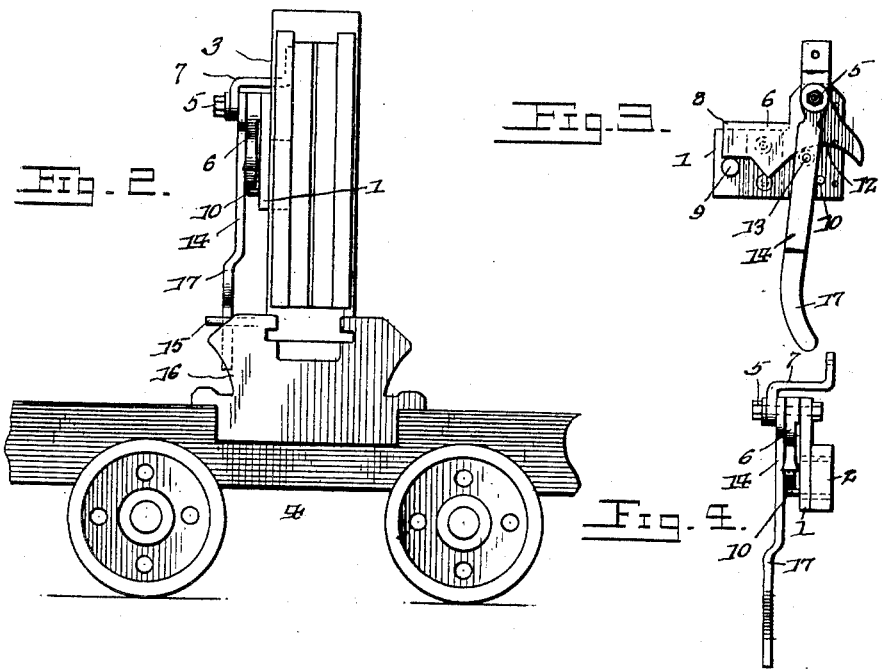
Witnesses
F. E. Alden.
J. J. Riley.
J. H. Brown, Inventor.
By C. A. Snow & Co.
Attorneys

UNITED STATES PATENT OFFICE.

JAMES HARDING BROWN, OF EAU CLAIRE, WISCONSIN.

ATTACHMENT FOR SAWMILL-CARRIAGES.

SPECIFICATION forming part of Letters Patent No. 675,506, dated June 4, 1901.

Application filed March 22, 1901. Serial No. 52,411. (No model.)

*To all whom it may concern:*

Be it known that I, JAMES HARDING BROWN, a citizen of the United States, residing at Eau Claire, in the county of Eau Claire and State of Wisconsin, have invented a new and useful Attachment for Sawmill-Carriages, of which the following is a specification.

The invention relates to an attachment for sawmill-carriages.

One object of the present invention is to provide a simple, inexpensive, and efficient device adapted to be readily mounted on a sawmill-carriage and capable of automatic operation to hold a small log and prevent the same from moving upward on the knees of the sawmill-carriage when the ordinary log-turning mechanism is operated.

A further object of the invention is to provide a device of this character which will be forced backward out of the way by a large log and which will be automatically swung inward when the knee approaches the outer end of the head-blocks to prevent it from coming in contact with the saw.

The invention consists in the construction and novel combination and arrangement of parts hereinafter fully described, illustrated in the accompanying drawings, and pointed out in the claims hereto appended.

In the drawings, Figure 1 is a transverse sectional view of a sawmill-carriage provided with an attachment constructed in accordance with this invention. Fig. 2 is an end elevation of one of the knees and a portion of the sawmill-carriage. Figs. 3 and 4 are detail views of the attachment.

Like numerals of reference designate corresponding parts in all the figures of the drawings.

1 designates a plate provided with a lower enlarged portion 2 and designed to be bolted or otherwise secured to one of the side faces of a knee 3 of a sawmill-carriage 4 and having its upper portion offset from the face of the knee to form a recess for the reception of the head of a pivot 5, upon which a dog 6 is mounted. The pivot, which may be of any desired construction, preferably consists of a bolt and is supported by a strap or bracket 7, secured to the knee at a point above the pivot and having an outwardly-extending L-shaped portion, which is perforated for the reception of the said pivot.

The dog 6, which is designed particularly for preventing small logs from rising on the knee when the ordinary log-turning mechanism is operated, is provided with a downwardly-inclined engaging portion, and it has an inwardly or rearwardly extending portion 8, forming a weight for holding the engaging portion of the dog normally in the extended position (illustrated in Fig. 1 of the drawings) and resting upon a projection or stop 9, whereby the engaging portion of the dog is rigidly held against upward movement. The projecting or engaging portion of the pawl or dog is adapted to be readily moved inward by a large log, and the inner portion will then swing upward above the projection or stop 9. The dog is purely automatic in its operation, and as soon as such large log is removed or sawed into lumber the dog will drop back into its normal position. The plate 1 is also provided near its front or outer edge with a projection or stop 10, arranged to be engaged by the outer portion of the dog to limit the inward swing of the same. The dog is provided at its bottom with a recess 12, in which is arranged a projection or pin 13, extending inward or laterally from a lever 14, which is fulcrumed at its upper end on the horizontal pivot 5 and which is adapted to engage a stop 15 of the head-block 16 for a purpose hereinafter explained. The lower portion 17 is angularly bent to offset it from the knee to clear the side of the head-block, and the pin or projection 13 may, as indicated in dotted lines, be provided with a reduced end which is received within a perforation of the lever. The lower end of the lever is slightly curved, and when the knee approaches the outer end of the head-block the lower end of the lever is carried into engagement with the stop 15 and is thereby held against further outward movement. This causes the lever to swing the inner or rear portion of the dog upward to withdraw its outer engaging portion and prevent it from projecting beyond the sawmill-carriage, so that it will not come in contact with the saw. When the knee is moved inward or backward, the dog and the lever resume their normal positions.

It will be seen that the attachment is simple and inexpensive in construction, that it is adapted to be readily applied to a sawmill-carriage, and that it is capable of operating automatically to hold small logs to prevent the same from rising on the knee when the ordinary log-turning mechanism is operated. It will also be apparent that the automatic gravity-dog is adapted to be moved inward by a large log and that it will be swung inward automatically by the lever when the knee is moved to the outer end of the head-block, whereby the dog will be prevented from coming in contact with the saw.

What I claim is—

1. A device of the class described comprising a pivotally-mounted gravity-dog arranged at one side of a knee of a sawmill-carriage and arranged to prevent a small log from moving upward when the ordinary log-turning mechanism is operated, said dog being adapted to be swung inward by a large log, and means for automatically swinging the dog inward when the knee reaches the end of the head-block to prevent the dog from coming in contact with the saw, substantially as described.

2. A device of the class described comprising a pivoted gravity-dog mounted on a knee of a sawmill-carriage and arranged to prevent a small log from moving upward on the knee, stops for limiting the movement of the dog, and means for automatically swinging the dog inward when the knee is moved to the outer end of the head-block, substantially as described.

3. A device of the class described comprising a pivoted dog, mounted on a sawmill-carriage knee and adapted to project therefrom to engage a small log, and capable of being moved inward by a large log, a lever provided with means for engaging the dog to swing the same inward, and a stop mounted on the head-block and adapted to be engaged by the lever, substantially as described.

4. A device of the class described comprising a plate provided with an enlarged portion and having a pivot, a bracket supporting the pivot, a dog mounted on the said pivot and having an extended inner portion, a projection receiving the inner portion of the dog, a stop mounted on the plate and arranged to be engaged by the outer portion of the dog, a lever suspended from the said pivot and provided with means for engaging the dog, and a stop mounted on the head-block and adapted to be engaged by the lever, substantially as described.

In testimony that I claim the foregoing as my own I have hereto affixed my signature in the presence of two witnesses.

JAMES HARDING BROWN.

Witnesses:
  F. H. L. COTTEN,
  WM. J. KESSLER.